(12) United States Patent
Lilly (10) Patent No.: US 6,855,415 B2
(45) Date of Patent: Feb. 15, 2005

(54) COATED THERMOPLASTIC FILM SUBSTRATE

(75) Inventor: Kenneth Lee Lilly, Evansville, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/999,042

(22) Filed: Nov. 1, 2001

(65) Prior Publication Data

US 2002/0114923 A1 Aug. 22, 2002

Related U.S. Application Data

(60) Division of application No. 09/417,605, filed on Oct. 14, 1999, now abandoned, which is a continuation-in-part of application No. 09/090,508, filed on Jun. 4, 1998, now abandoned.
(60) Provisional application No. 60/065,699, filed on Nov. 14, 1997.

(51) Int. Cl.[7] .............................. B32B 27/00; C08F 2/48; C08J 7/18
(52) U.S. Cl. ....................... 428/332; 428/334; 428/337; 428/409; 428/412; 428/413; 428/447; 428/522; 427/487; 427/508; 427/515
(58) Field of Search ................................ 428/332, 334, 428/337, 409, 412, 522, 413, 447; 427/487, 508, 515

(56) References Cited

U.S. PATENT DOCUMENTS

| | | | |
|---|---|---|---|
| 3,756,760 A | 9/1973 | McBride | 425/363 |
| 4,027,073 A | 5/1977 | Clark | 428/412 |
| 4,198,465 A | 4/1980 | Moore et al. | 428/409 |
| 4,344,830 A | 8/1982 | Olson | 204/159.16 |
| 4,351,920 A | 9/1982 | Ariga et al. | 525/67 |
| 4,455,205 A | 6/1984 | Olson et al. | 204/159.13 |

(List continued on next page.)

FOREIGN PATENT DOCUMENTS

| | | |
|---|---|---|
| DE | 24 25 957 A | 12/1975 |
| EP | 0 228 671 A1 | 7/1987 |
| EP | 0 292 219 A2 | 11/1988 |
| EP | 0 369 780 A | 5/1990 |
| EP | 0 759 448 A1 | 2/1997 |
| JP | 01 176477 A | 7/1989 |
| JP | 08 132515 A | 5/1996 |
| NL | 8 602 018 A | 3/1988 |
| WO | WO 88 00217 A | 1/1988 |
| WO | WO 98/50441 | 12/1998 |

OTHER PUBLICATIONS

D.R. Olson, J. Applied Polymer Science 28, 1983, p. 1159.

*Primary Examiner*—Monique R. Jackson (57) ABSTRACT

A product and a method for producing a product consisting of a thermoplastic substrate having a cured coating thereon. The coating consists of the ultra-violet radiation cured product of a brominated epoxy acrylate oligomer, a polyfunctional acrylate monomer, a silicone hard coat and a photoinitiator. The coated thermoplastic substrate has a low birefringence (<25 nm), and a low delta refractive index between the coating and thermoplastic substrate and a smooth upper surface having a gloss of at least 90% and a surface roughness of about 10.0 μm or less. In order to obtain such a product, the thermoplastic substrate must be prepared by first producing a substrate having a smooth lower surface and a textured upper surface to which is applied the curable coating. A thermoplastic substrate, particularly an aromatic polycarbonate substrate, is prepared by passing a heated substrate between a pair of rolls wherein the upper roll has a textured surface and the lower roll has a smooth polished surface.

13 Claims, 2 Drawing Sheets

U.S. PATENT DOCUMENTS

| | | | |
|---|---|---|---|
| 4,477,529 A | 10/1984 | Campbell | 428/412 |
| 4,478,876 A | 10/1984 | Chung | 427/54.1 |
| 4,486,504 A | 12/1984 | Chung | 428/412 |
| 4,491,508 A | 1/1985 | Olson et al. | 204/159.13 |
| 4,790,893 A | 12/1988 | Watkins | 156/232 |
| 4,836,874 A | 6/1989 | Foster | 156/209 |
| 4,968,370 A | 11/1990 | Watkins | 156/232 |
| 5,076,987 A | 12/1991 | Wank et al. | 264/210.2 |
| 5,162,390 A | 11/1992 | Tilley et al. | 522/64 |
| 5,227,240 A | 7/1993 | Tilley et al. | 428/412 |
| 5,242,272 A | 9/1993 | Ven et al. | 417/122 |
| 5,242,742 A | 9/1993 | Funk et al. | 428/215 |
| 5,271,968 A | 12/1993 | Coyle et al. | 427/558 |
| 5,281,371 A | 1/1994 | Tamura et al. | 264/1.3 |
| 5,286,436 A | 2/1994 | Funk et al. | 264/210.2 |
| 5,411,788 A | 5/1995 | Hyde et al. | |
| 5,455,105 A | 10/1995 | Coyle et al. | 428/215 |
| 5,466,319 A | 11/1995 | Zager et al. | 156/220 |
| 5,468,542 A | 11/1995 | Crouch | 428/215 |
| 5,475,053 A | 12/1995 | Niessner et al. | 525/64 |
| 5,579,296 A | 11/1996 | Smith et al. | 369/273 |
| 5,631,307 A | 5/1997 | Tanaka et al. | 522/25 |
| 5,670,240 A | 9/1997 | Davis | 428/195 |
| 5,712,324 A | 1/1998 | Lilly | 522/75 |
| 5,811,472 A | 9/1998 | Patel | 522/14 |

COATED THERMOPLASTIC FILM SUBSTRATE

CROSS REFERENCE TO RELATED APPLICATIONS

This is a divisional of a of co-pending application Ser. No. 9/417,605 filed on Oct. 14, 1999, now abandoned which is a CIP of Ser. No. 09/090,508 filed on Jun. 4, 1998 now abandoned, which is a Provisional of 60/065,699 filed on Nov. 14, 1997.

FEDERALLY SPONSORED RESEARCH

Not applicable

BACKGROUND OF THE INVENTION

This invention relates to a method for producing coated thermoplastic substrates that have smooth upper and lower surfaces with certain critical criteria which are particularly useful in optical media applications, such as CD-ROM cards. Such applications require the use of substrates having polished surfaces on both sides, a birefringence of less than twenty-five nanometers (25 nm) and wherein the coating and thermoplastic substrates have a low delta refractive index. Further requirements for optical media applications include abrasion, chemical and UV radiation resistance, and clarity. Moreover, thermoplastic films must transmit, rather than reflect, light to be acceptable for optical applications.

Polycarbonate films generally have acceptable levels of clarity and strength, but lack acceptable levels of birefringence, abrasion resistance, chemical and UV radiation resistance, and smoothness for optical applications. For example, uncoated polycarbonate films generally have high birefringence, which is in part due to the levels of stress which are placed on the film during its formation. This stress is frozen into the film upon cooling. Moreover, uncoated polycarbonate films generally have poor abrasion resistance and chemical resistance. Uncoated polycarbonate films are also susceptible to degradation by UV radiation.

Radiation curable acrylic coatings and methods for their application to polycarbonate substrates are known. (See, e.g., European Patent No. 228,671). While conventional methods exist for applying radiation curable acrylic coatings to polycarbonate film, the adhesion of these cured coatings to the underlying polycarbonate can be less than desirable. Moreover, conventional methods do not carefully control the smoothness of the films, which is critical for optical applications. For these reasons, polycarbonate films have not been compatible with optical applications because the required adhesion, clarity and smoothness properties have not generally been attainable prior to the present invention.

Conventional radiation curable acrylic coating compositions are also problematic because they employ non-reactive solvents to reduce the viscosity of the coating compositions during application thereof to the polycarbonate substrate. These non-reactive volatile components must later be eliminated from the coatings by applying a forced hot air drying system, which may produce a coating having unacceptable bubbles and surface roughness. It is also undesirable to use coating compositions containing substantial levels of non-reactive, volatile components such as solvents, because they create environmental and safety concerns.

Abrasion resistant thermoplastic films having improved optical properties may be manufactured by curing a solvent-free radiation curable coating composition after application to the surface of a polymeric sheet or film. This curing process may be accomplished by directing radiant energy through the substrate opposite the surface being coated. This "cold-casting technique" is further illustrated in U.S. Pat. No. 5,468,542, to Crouch, which is hereby incorporated by reference. Although improved surface characteristics can be achieved with the radiation curable coating compositions disclosed in U.S. Pat. No. 5,468,542, such coated thermoplastic films are not suitable for optical applications because no effort is made to match the indices of refraction of the coating and substrate to avoid light reflection at the interface (i.e., provide a low delta refractive index).

Also, U.S. Pat. Nos. 5,455,105 and 5,271,968 to Coyle et al. disclose an article and process for producing acrylic coated polycarbonate articles particularly films. While the process disclosed therein is suitable for producing a coated thermoplastic film, the references do not disclose or address the requirement for producing a film that has a critical properties of low birefringence and a minimal or low delta refractive index between the coating applied to the film substrate and the film substrate. These patents are hereby incorporated by reference.

In summary, conventional methods are inadequate for producing thermoplastic film suitable for use in optical media applications, because such methods do not produce thermoplastic film that has acceptable levels of birefringence, abrasion resistance, chemical and UV resistance, smoothness, and clarity together with a low delta refractive index (i.e., the difference in refractive index between the coating and the substrate). Specifically, birefringence, which is related to the residual stress in the film upon molding and cooling, must preferably be kept below 25 nm. Also, the film must be polished on both sides to avoid light scattering. Moreover, if the film is coated, the delta refractive index must be sufficiently low to avoid unacceptable light reflection at the interface.

It is also generally known in theory to produce polycarbonate films by extruding heated resin and passing the extruded resin through a nip between two polished metal rolls. This process is unsuitable for producing low birefringence films because it introduces a high level of stress in the films which increases the birefringence of said films.

In view of the foregoing, it would be advantageous to provide thermoplastic films which are suitable for optical media applications. It would further be desirable to provide an efficient method for making such films which avoids the shortcomings of the prior art.

Accordingly, it is one object of this invention to provide a particular thermoplastic film substrate suitable for coating with a particular coating composition wherein one side is textured and the other side is a polished surface, the film substrate having a low residual stress that may be subsequently coated with a particular coating composition and thereby forming a film having two smooth sides.

It is another object of the invention to provide coated thermoplastic films wherein the top and bottom surfaces are sufficiently smooth to avoid unacceptable light scattering, and the delta refractive index between the coating and film is sufficiently low to avoid unacceptable light reflection at the interface.

It is yet another object of this invention to provide a method for producing coated and uncoated thermoplastic films, which method does not require using solvents or other volatiles which may lead to imperfections in the films and present environmental concerns.

Still another object of the invention to provide a method of making a coated film having low birefringence.

It is another object of the invention to provide a method of making a one-side textured and one-side polished film substrate having low residual stress.

It is a further object of the invention to provide a method of making a coated thermoplastic film which is compatible with optical applications wherein the coating adheres strongly to the substrate.

SUMMARY OF THE INVENTION

The present invention is directed to products and a process for preparing products namely a thermoplastic film substrate suitable for coating and a coated film suitable for use in optical applications such as CD's or CD-ROM's. The method comprises the steps of (1) passing a thermoplastic film having an upper and a lower surface through a pair of rollers, (2) applying a curable coating to the upper surface of the thermoplastic film substrate and (3) curing the coating by ultraviolet radiation to form a cured coated thermoplastic film substrate. The coating on the upper surface forms a smooth surface to avoid unacceptable scatter of a light beam impinging upon a said surface. The top roll imparts a texture surface to the upper surface of the film substrate. The lower surface of the thermoplastic film substrate has a smooth surface imparted by a smooth polished roll in contact with the lower surface. The cured coated thermoplastic film substrate prepared as so disclosed is then available for use in optical applications.

DETAILED DESCRIPTION OF THE INVENTION

The present invention comprises a method for producing a particular coated thermoplastic substrate for optical applications exhibiting exceptional smoothness of the upper and lower surfaces of the thermoplastic film and products produced therefrom. The critical features of the coated thermoplastic film are that the upper surface must have a low birefringence and that the difference in refractive index between the coating and film substrate must be minimal. In the practice of this invention, the thermoplastic film substrate is passed through a pair of rolls generally lying in a horizontal plane consisting of top roll and a bottom roll. The top roll imparts a textured surface to the upper surface of the thermoplastic film substrate. The bottom roll imparts a polished surface to the lower surface of the film substrate by employing a polished or standard chrome plated surface roll. The upper roll, on the other hand, imparts a textured surface to the upper surface of the film substrate due to the top roll having a smooth low friction surface which textures the upper surface of the film substrate. This allows the film substrate to "slip" such that the level of stress is reduced in the film below which would be obtained if the top roll were metallic. This reduction in the level of stress produces a film having low birefringence. The upper roll may be provided with a sleeve formed from a resilient material such as rubber or synthetic rubber polytetrofluroethylene (PTFE) or polypropylene. The sleeve is snugly fitted over the roll surface to provide a smooth, friction-minimizing surface for contacting the substrate film. The preferred sleeve is rubber or a synthetic rubber compound which rubber surface acts as an insulator to prevent too rapid of a cooling of the film. Rapid cooling of the upper surface of the film could cause increased stress and thus high birefringence as would occur if the roll surface were metallic.

Further in the practice of this invention, the thermoplastic film substrate is preferably prepared by extruding the film through the die orifice of an extruder. The film is then passed through a pair of rolls as described above while the film is still at an elevated temperature. Alternatively, the film may be first prepared, stored such as in roll form and then when needed, heated before being passed through the pair of rolls. The substrate employed herein is preferably an aromatic polycarbonate material, although other thermoplastic materials may be employed that are suitable for optical applications.

The substrate prepared as described above is then processed to provide a cured coating on the surface of the thermoplastic film substrate to provide a coated thermoplastic film having a smooth surface on the upper surface. In order to provide a smooth upper surface to the thermoplastic film substrate, the textured surface is coated with a particular composition and then cured. The coating composition comprises a brominated epoxy acrylate oligomer component, a polyfunctional acrylate monomer, a silicone hard coat composition and a photoinitiator.

The present invention discloses a novel process technique that will produce a low stress polycarbonate film (0.005" to 0.030" thickness) that retains an excellent surface appearance. This technique can produce film with birefringence of less than twenty-five (25) nm and a surface gloss of at least ninety percent (90%). The substrates used in this process are preferably made from a polycarbonate resin. A preferred polycarbonate substrate for the method of the present invention is one formed from a thermoplastic polycarbonate material, such as LEXAN®resin, a product of General Electric Company. Typical examples of polycarbonate resins are described in U.S. Pat. No. 4,351,920, which is incorporated herein by reference, and are obtained by the reaction of aromatic dihydroxy compounds with phosgene. Other polycarbonate resins may be obtained by the reaction of aromatic dihydroxy compounds with carbonate precursors such as diaryl carbonates. U.S. Pat. No. 4,351,920 also describes various methods for the preparation of aromatic polycarbonate resins, which may be used as substrates in the present invention. A preferred aromatic dihydroxy compound is 2,2-bis(4-hydroxy phenyl) propane, (i.e., Bisphenol-A). The term aromatic polycarbonate resins is also meant to include polyester carbonates obtained from the reaction products of a dihydroxy phenol, a carbonate precursor and a dicarboxylic acid such as terephthalic acid and isophthalic acid. Optionally an amount of a glycol may also be used as a reactant. Polycarbonate film may be made by well-known methods. Typically, the molten thermoplastic is cast onto an extrusion roll stack, and both sides of the material are polished and pressed to a uniform thickness. Preferably the polycarbonate film has a thickness of about five (5) to twenty (20) mils.

The brominated epoxy acrylate oligomer may be represented by the formula:

wherein

Y is bromine,

X is hydrogen or methyl group and n is 0 to 8. However, at least 20% of the total amount of this component must have n=4–8.

Examples of this component include phenol novolak epoxide (meth)acrylates, creosol novolak epoxide (meth)acrylates and bisphenol A epoxide (meth)acrylates and bisphenol A epoxide (meth)acrylate resins.

In the case of phenol novolak epoxy (meth)acrylates, it is referred that 4<=n<6. If n<4, there is a problem in the flexibility of the coating film, while at 7<=n, it becomes difficult to dilute with a alcoholic solvent.

In the case of cresol novolak epoxy (meth)acrylates, the proper relation is 4<=n<=8. If n<4, the flexibility of the coating film presents some problems, while difficulty in dissolving in the alcoholic solvents may result, if n>8.

The n value of the above novolak epoxy (meth)acrylate is determined by styrene conversion in gel permeation chromatography.

It is desirable that the above-discussed oligomer have a molecular weight of less than 10,000.

If the phenol nonolak epoxy (meth)acrylate oligomer is employed at great than 5% of the composition, the flexibility and adhesion of the composition is improved. However, at greater than 10%, the viscosity of the coating is undesirably raised, thus making it impossible to form a thin film of less than 10 microns in thickness.

With regard to the polyfunctional monomer component having 3 or more meth(acryloyloxy) groups per molecule, the function of this component is to improve the cross-liking density of the composition. Suitable examples include trimethylolpropanetri (meth)acrylates, dipentaerythritoltri (meth)acrylates, dipentaery-thritolhydroxytetra (meth)acrylates and epoxy (meth)acrylates. This component comprises 80 to 90% by weight of the polymerizable portion of the composition.

It is especially preferred to employ dipentaerythritolhydroxytetra (meth)acrylate or trimethylolpropanetri(meth)acrylate or both in the ratio of 80/20 to 0/100 by weight.

With regard to the acrylic monomer component having two or less functional groups, there may be mentioned alkyl, cycloalkyl, glycyzirtetrahydrofurfuryl, allyl, hydroxy alkyl, alkylene glycol, polyoxyalkylene glycol, trimethylol propane, pentaerythritol or urethane mono- or di(meth)acrylates. These are employed at 5 to 10% by weight of the polymerizable portion of the composition. If this component is present at more than 10%, sufficient surface hardness cannot be obtained.

The hardcoat composition employed in the practice of this invention is preferably an organopolysiloxane comprising a silyl acrylate of the formula, and aqueous colloidal silica, and optionally with acrylic monomer of the formula, to provide a UV curable organopolysiloxane hardcoat composition curable to an adherent abrasion resistant coating in several seconds or less, where R is a $C_{(1-3)}$ monovalent radical, $R^1$ is a $(C_{1-8})$ alkyl radical, $R^2$ is selected from hydrogen and R radicals and mixtures thereof, $R^3$ is a divalent $(C_{1-8})$ alkylene radical and $R^4$ is a polyvalent organic radical, a is a whole number equal to 0 to 2 inclusive, b is an integer equal to 1–3 inclusive, and the sum of a+b is equal 1 to 3 inclusive, n is an integer having a value of 2 to 4 inclusive. The organopolysiloxane is fully described in U.S. Pat. No. 4,455,205 which is incorporated herein by reference.

The photoinitiator employed in the coating composition include carbonyl compounds such as 1-hydroxy cyclohexyl phenyl ketone, benzoin, benzoin methyl ether, benzoin ethyl ether, benzoin propyl ether, benzoin isobutyl ether, acetoin, butyroin, toluoin, benzil, benzophenone, p-methoxybenzophenone, 2,2-diethoxyacetophenone, α-α-dimethoxy α-phenylacetophenone, methylphenyl glyoxylate, ethylphenyl glyoxylate, 4,4'-bis-(dimethylaminobenzophenone), 2-hydroxy-2-methyl-1-phenyl-1-propanone; sulfur compounds such as tetramethylthiuram monosulfide and tetramethylthiuram disulfide; azo compounds such as azobisisobutyronitrile and azobis-2,4-dimethylvaleronitrile; and peroxide compounds such as benzoyl peroxide and di-tert-butyl peroxide.

Preferred photoinitiator compounds having peak sensitivities between 365–400 nm include thioxanthone photoinitiators and acylophosphine oxide photoinitiators. Specific examples of thioxane photoinitiators include 7-chlorothioxanthone, 2,4-diethylthioxanthone and 2,4-diisopropylthioxanthene. Since use of these thioxanthone photoinitiator may result in a hardened coating tinged in yellow, acylophosphine oxide photoinitiators and 2 hydroxy 2 methyl 1 phenyl-1-propanone, are more preferable. Among the acylophosphine oxide photoinitiators, the more preferred are those represented by the general formula:

Wherein $R^3$, $R^4$ and $R^5$ each independently represent an alkyl or oxyalkyl group having 1–8 carbon atoms or a phenyl substituted phenyl, benzyl or substituted benzyl group. The most preferred acylophosphine oxide photoinitiators are those represented by Formula I in which $R^3$, $R^4$ and $R^5$ are each independently an oxyalkyl group having 1–9 carbon atoms, a phenyl group or a substituted phenyl group. Specific examples of a particularly preferred phosphone oxide photoinitiators include diphenyl (2,4,6-trimethylbenzoyl) phosphine oxide (hereinafter "Lucirin TPO") and benzoylidiethoxyphosphine oxide.

The uncoated, one-side textured film substrate has a surface gloss of at least 85% as measured at 85 degrees in accordance with ASTM D523. The average surface roughness (Ra) of the textured uncoated substrate is about 20 to about 40 micrometers ($\mu$m) and is preferably produced by using a polytetrafluoroethylene (PTFE) material having a surface roughness of 0.3 to 0.8 $\mu$m as the surface on the top roll. The bottom roll produces a polished side of the lower surface by using a standard chrome plated roll. The textured upper surface of to film substrate is smoothed with a curable coating to a surface roughness of about 3 to about 10 $\mu$m. Also, a lower delta refractive index between the coating and the textured surface should be preferably less than about 0.1 preferably less than about 0.08 and more preferably less than 0.05. This idea can be applied to other amorphous and crystalline thermoplastic materials, and is not limited to aromatic polycarbonate. Other requirements for optical media applications include abrasion and ultraviolet (UV) resistance, substrate thickness consistency and ability to die cast the cured article immediately after lamination. Another requirement is that the substrate should be a barrier to water vapor A coating formulation employed herein for coating the thermoplastic film substrate comprises an acrylate, a silicone coating and a photoinitiator. Preferably the coating composition comprises greater than 75% by weight of the acrylate, less than 20% by weight of a silicone (organopolysiloxane) hardcoat composition and less than 5 weight % of a photoinitiator, based upon the total weight of the coating composition. The acrylate component maybe a modified acrylate such as an epoxy, ether, polynol and/or urethane modified acrylates is preferably a bromine epoxy modified acrylate wherein a brominated epoxy acrylate oligomer is reacted with an acrylate monomer during curing of the coating composition. The photoinitiator compounds include carbonyl compounds, sulfur compounds, peroxide compounds, thioxanthone compounds, and acylophosphine oxide compounds. The silicone coating composition provides a hard abrasion resistant coating and is preferably an organopolysiloxane composition.

The ultraviolet radiation-curable coating compositions are generally comprised of monomers and oligomers containing acrylic, methacrylic, and vinylic unsaturation as well as other 100% solids convertible materials (e.g., monomer-soluble polymers and elastomers, inorganic silica fillers and pigments and the like, etc.). The coating systems generally comprise monomers having molecular weights of from about 100 to 1000, and having single unsaturation or di-, tri-, or higher multi-functional unsaturation sites. In the practice of the present invention, the coating is preferably substantially free (of less than one percent (1%)) of volatile, non-reactive components. The coating compositions are preferably ninety-nine percent (99%) to one hundred percent (100%) by weight reactive components and solid materials. In a more preferred version, the coatings are 99.9 percent to 100 percent by weight reactive components and solid materials. In a most preferred version, the coatings are 100 percent by weight reactive components and solid materials. The solid materials may include non-volatile solid materials such as polymeric materials and colloidal silica. Suitable polymeric materials include cellulose acetate butyrate. The coating composition is preferably 100 percent convertible to solids upon exposure to ultraviolet radiation. The composition also contain an amount of a photoinitiator effective to permit photo curing of the composition. In a preferred embodiment, the curable coating composition comprises approximately 98 wt % of an acrylate, and 2 wt % of a photoinitiator.

The preferred acrylic coating composition contains a substantial level of a relatively low molecular weight aliphatic alkane diol diacrylate which will penetrate, via diffusion, the region below the surface of polycarbonate substrate upon contact and exposure to elevated temperatures. A suitable aliphatic alkane diol diacrylate is 1,6-hexanediol diacrylate. A preferred acrylate coating composition contains from five percent (5%) to sixty percent (60%) by weight of an aliphatic alkane diol diacrylate based on the total weight of the coating composition. The aliphatic diol diacrylate preferably contains from two (2) to twelve (12) carbon atoms in the aliphatic portion thereof. Suitable aliphatic diol diacrylates include ethylene glycol diacrylate, butane diol diacrylate, hexane diol diacrylate, octaine diol diacrylate, decane diol diacrylate. A preferred coating composition contains about thirty-seven percent (37%) by weight trimethylolpropane triacrylate (TMPTA), about fifteen percent (15%) by weight dipentaerythritol monohydroxy pentacrylate (DIPEPA) thirty-seven percent (37%) by weight 2,6-hexanediol diacrylate, about nine percent (9%) cellulose acetate butyrate (CAB) and about two percent (2%) by weight of the photoinitiator, diethoxyacetophenone (DEAP). A preferred silica filled acrylic coating employs a mixture of twenty-two percent (22%) 1,6-hexanediol diacrylate, twenty-two percent (22%) trimethylolpropane triacrylate, thirty-five percent (35%) functionalized colloidal silica, seven percent (7%) of a latent ultraviolet radiation absorber such as benzene sulfonate ester of Cyasorb Registered TM 5411 (BSEX) as described by D. R. Olson, J. Applied Polymer Science 28, 1983, p. 1159, incorporated herein by reference and three percent (3%) of a photoinitiator such as diethoxyacetophenone (DEAP). Suitable functionalized colloidal silica is set forth in Olson et al., U.S. Pat. No. 4,455,205; Olson et al., U.S. Pat. No. 4,491,508; Chung, U.S. Pat. No. 4,478,876, and Chung, U.S. Pat. No. 4,486,504, all incorporated herein by reference.

Abrasion resistant thermoplastic composites having improved optical properties may also be made by effecting the cure of a solvent-less radiation curable coating composition which has been applied onto the surface of a polymeric sheet or film. The cure of the applied coating material can be effected while it is in contact with a smooth surface (cold casting) by directing radiant energy through the substrate opposite the surface being coated. (See, e.g., U.S. Pat. No. 5,455,105, which is hereby incorporated by reference) The "cold-casting technique" is further illustrated in U.S. Pat. No. 5,468,542, issued to Crouch, which is incorporated by reference herein.

Accordingly, the low stress film is produced by:

(Step 1) Producing a one-side textured, and one-side polished polycarbonate film.

The gloss of the textured side as measured at 85° in accordance with ASTM D523 has a surface gloss in the range of 90% to 100%. The Ra (surface roughness) of the uncoated film is twenty (20) to forty (40) μm and is produced by using super smooth PTFE material (Ra of 0.3 to 0.8 μm) as the covering on the top roll. The bottom roll uses a standard chrome polish material, wherein Ra=0.05 μm.

(Step 2) Smoothing the textured side in step 1 with a curable coating to an Ra of three (3) to ten (10) μm.

Figure 1:
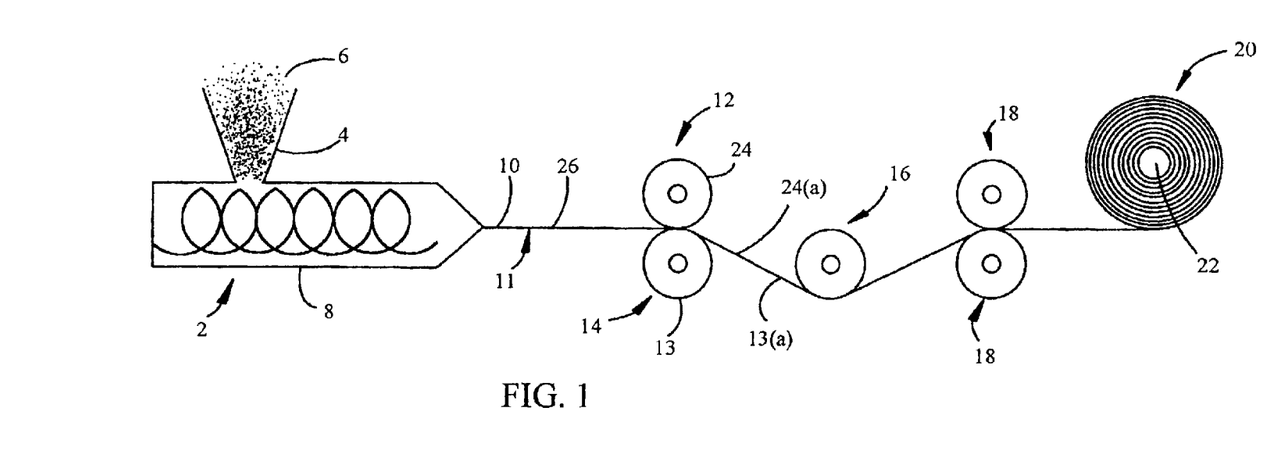
FIG. 1 is a schematic view of an extruder illustrating the extrusion of a thermoplastic film through rolls for producing the thermoplastic film substrate of the invention.
Figure 2:
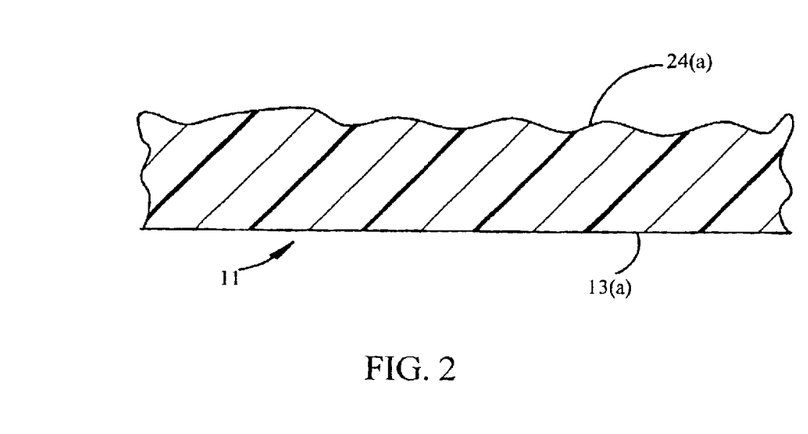
FIG. 2 is a sectional view of the thermoplastic film substrate extruded from the extruder of FIG. 1.
Figure 3:
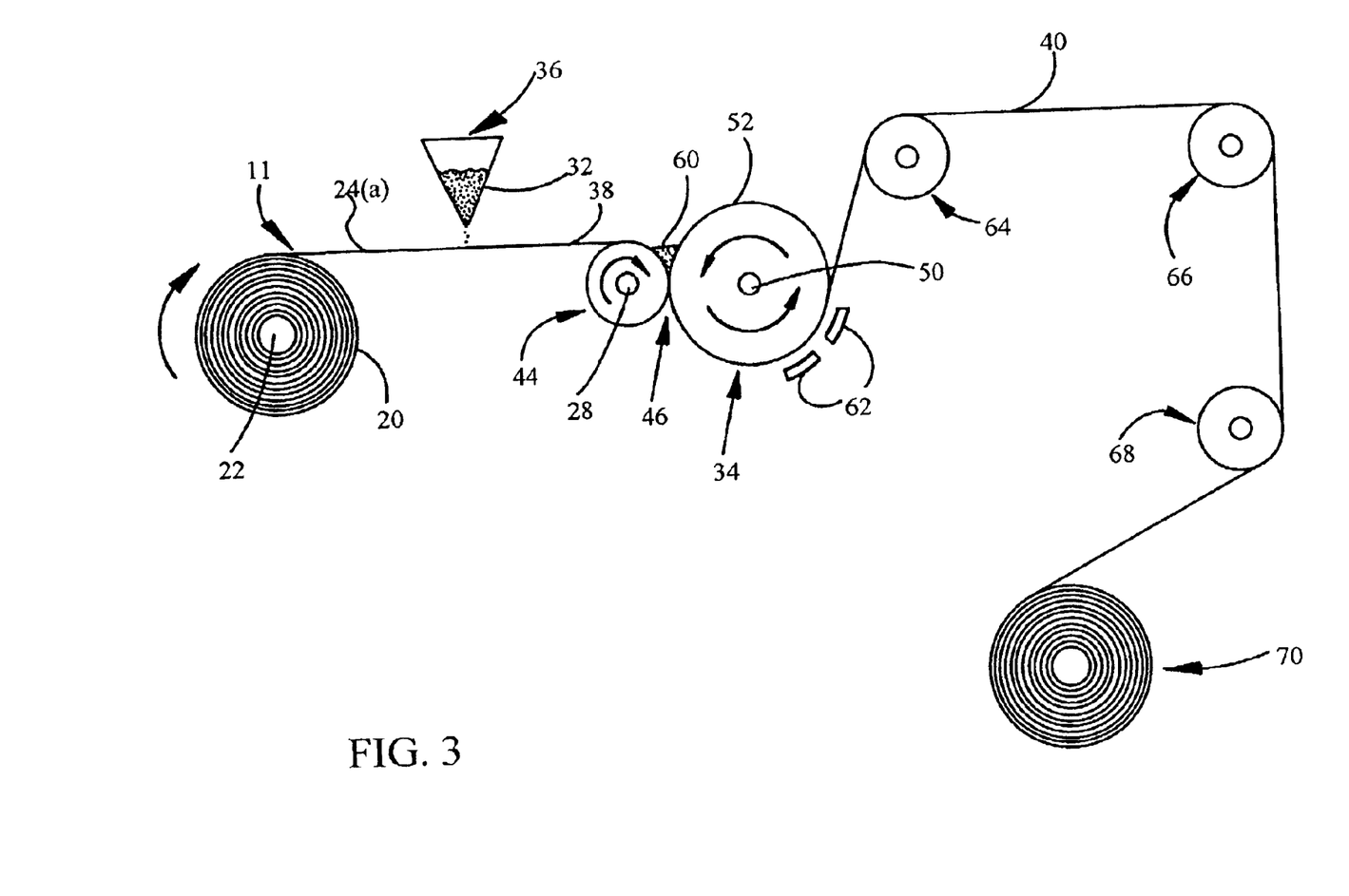
FIG. 3 is a schematic view of coating the thermoplastic substrate of this invention.

A suitable apparatus for producing the thermoplastic substrate and for applying and curing the coating on the surface of the thermoplastic substrate in accordance with the invention are illustrated in FIGS. 1, 2 and 3. FIG. 1 is a schematic drawing illustrating extruder 2 with feed hopper 4 and through which a thermoplastic resin 6 is fed to barrel 8 of extruder 2. The extruder is heated to temperature sufficient to melt thermoplastic resin 6 which is advanced through extruder 8 to film die orifice 10. The extruded thermoplastic resin film 11 is passed through the nip of rolls 12 and 14 and around roll 16 through pull rolls 18. The cooled uncoated film is formed or rolled into roll 20 surrounding a roll core 22. Roll 12 has a textured surface 24 as may be provided with a sleeve made of a resilient material such as polytetrafluoroethylene (PTFE) or a synthetic rubber or blends of rubber so as to provide a friction minimizing surface for contacting surface 26 of film 11 to provide textured surface 24(a) to film 11. Roll 14 has a polished surface 13 which imparts a polished lower surface 13(a) to film 11. Roll 14 may be a chrome plated steel roll or such other metal to provide a polished surface.

FIG. 2 is a cross section of film 11 illustrating the textured upper surface 24(a) and polished lower surface 13(a) as the film leaves rolls 12 and 14 of FIG. 1.

In FIG. 3, radiation-curable coating material 32 is continuously applied by flowing it onto surface 24(a) of film 11 at a controlled rate.

EXAMPLES

The following examples are provided merely to show one skilled in the art how to apply the principles discussed herein. These examples shall not be used to limit the scope of the appended claims.

Example 1

A Coating Suitable for Application to a One Side Polished, One Side Textured Film The present example shows that best balance of optical, chemical, and abrasion resistance is given by the following coating formulation: 1 percent (1%) Irgacure 819 photoinitiator, (phenyl bis (2,4,6 trimethyl benzoyl), 1 percent Darocur 1173 photoinitiator (2-hydroxy-2-methyl-1-phenyl-1-propane) made by CIBA and also known as HCPK, ten percent (10%) FCS100 (52 wt. % colloidal, silica, 42 wt. % acrylate monomer made by GE Silicones and is a silicone coating solution, and eighty-eight percent (88%) RX-0726 made by UCB Chemicals which is a mixture of a brominated epoxy acrylate oligomer (>50%) and an acrylate (mono-functional monomer (<50 wt. %). The coating surface must be as smooth as possible to prevent laser scattering. Since the reflected laser signal contains the audio and video information from the CD-ROM, if scattering occurs, the information will be lost. It has been determined through experimentation that the coating finish must have a maximum Ra value of 2.0 microns or less.

TABLE 1

| Formulation | Diameter of Laser Spots | Diffraction or Scattering of Spots | Finish (Ra) |
|---|---|---|---|
| Control | 0.7 mm | none | Laser only, no sample |
| 1 | 0.45 | yes | 10 micron |
| 2 | 0.60 | no | 2 micron |
| 3 | 0.50 | yes | 6 micron |
| 4 | 0.50 | yes | 5 micron |

The tested formulations were as follows: Formulation #1 is=88 wt % RX0726, 10% FCS100, and 2% Lucirin TPO; Formulation #2 is=88 wt % RX0726, 10% FCS100, and 1% Darocur 1173, and 1% Irgacure 819 photoinitiator (phenyl bis(2,4,6 trimethyl benzoyl), Formulation #3=88 wt % RX0726, 10% FCS100, and 2% Darocur 1173; and Formulation #4 is 88 wt % RX0726, 10% FCS100, 1% Lucirin TPO [dihenyl(2,4,6-trimethylbenzoyl)phosphine oxide], and 1% Darocur 1173.

From the table above it is apparent that formulation #2, which incorporates an acrylate, a photoinitiator and a silicone coating solution exhibits improved surface smoothness, and consequently, less laser scattering. While Lucirin TPO and Darocur 1173 provide adequate cross-linking in the bulk, only the combination of Darocur 1173 and Irgacure 819 photoinitiator provide adequate cross-linking in the bulk and surface. If the surface is not completely cross-linked, the finish will be compromised. It will be immediately recognized by those skilled in the art, however, that variations on the above examples may provide equally improved results and are all within the intended scope of the present invention.

Example 2

A Process for Coating a One-side Polished, One-side Textured Film

Substrate film 11 is advanced from roll 20. Substrate 11 is unwound pursuant to the movement of casting drum 34 (described below). Coating material 32 is applied to the textured surface 24(a) of substrate film 11 by dripping it onto surface 24(a) of substrate film 11 using applicator 36. It will be apparent to those skilled in the art that adjustments may be made in the coating system in order to apply the coating to the substrate efficiently. Coating material 32 may be applied to surface 24(a) of substrate film 11 by any of a number of well-known roll coating methods, such as spraying, brushing, curtain coating, and dipping, as well as other well-known roll coating methods, such as reverse roll coating, etc. forming coating 38 on surface 24(a) of substrate film 11. The thickness of radiation-curable coating 38 and the thickness of the resultant cured hard coat 40 is dependent upon the end use of the article and the physical properties desired. Their thickness may range from about 0.05 mil to about 5.0 mils for the nonvolatile coating. The preferred thickness is from about 0.2 mil to about 1.0 mil.

After coating material is applied to surface 24(a) of substrate film 11, the coated substrate 11 is guided to nip roll 46 formed between roll 44 and casting drain 34. The choice of materials which form the roll 44 used in the present invention is not critical. The rolls may be made of plastic, metal (i.e. stainless steel, aluminum), rubber, ceramic materials, and the like. The cured acrylic coating layer directly adheres to the thermoplastic film substrate by heating the curable coating composition to a temperature between about 90° F. and about 150° F. and by ultraviolet radiation curing the heated applied coating composition whereby an interlocking bond between the substrate and cured coating is formed.

As shown in FIG. 3, casting drum 34 is situated in a position adjacent roll 44, such that the outer circumferences of roll 44 and drum 34 are adjacent to each other at an interface defining nip 46 which is described below. The applied pressure at the interface of roll 44 and drum 34 may be adjusted by well known methods, such as air cylinders (not shown), attached to axle 28 of roll 44, which selectively urges the roll toward drum 34. Typically, the applied pressure at the interface is slight, i.e. less than five (5) pounds per linear inch, when the substrate is not passing through nip 46. The applied pressure can be readjusted according to a variety of parameters when a substrate having a coating thereon is passing through nip 46, as described below.

Casting drum 34 surrounds central axle 50, and is preferably made from a material which is conductive to heat, and preferably comprised of stainless steel or chromium-plated steel. Furthermore, it is preferred that the drum be independently driven by an outside power source (not shown).

Although a nitrogen blanket may be employed to ensure an anaerobic cure of the coating composition it is preferred that an anaerobic cure be obtained without the use of such a nitrogen blanket. In order to minimize the presence of air in coating 38 prior to curing, without the use of a nitrogen gas blanket, the pressure capable of being exerted at nip 46 is carefully adjusted. The adjustment of applied pressure at nip 46 maybe accomplished as described above. To obtain a certain coating thickness the exact pressure that will be exerted at nip 46 will depend on factors such as the viscosity of coating composition 32, the substrate speed, the degree of detail in the design pattern on surface 52 (if present), and temperature of the casting drum. Typically, for a substrate having a thickness of fifteen (15) mils having applied thereon an acrylic-based coating having a thickness of 0.8 mil and a viscosity of 400 centipoises, at a substrate speed of fifty (50) feet per minute and a roll cover of 30 durometer hardness (Shore A), a nip pressure of twenty-five (25) pounds is applied to the coated substrate. The coating is thereby pressed into contact with both substrate film 11 and casting drum surface 52, thereby ensuring that there is a substantial absence of free diatomic oxygen from the coating during curing, so as to ensure a substantially complete curing of the coating and a cured hardcoat 40, exhibiting a minor image of the texture and/or pattern of casting drum surface 52. Excess coating forms a bead 60 of uncured coating composition material above nip 46 and across the width of the drum. This bead 60 ensures that adequate coating material enters through nip 46 across the width of the drum.

After substrate film 11 having coating 38 applied thereon passes through nip 46, the coating may be cured by means of ultraviolet radiant energy. As shown in FIG. 3, lamps 62 transmit ultraviolet radiation energy into substrate film 11. The radiant energy passes through the transparent substrate 11 and is absorbed by coating 38, the latter being compressed between substrate 11 and drum surface 52. The preferred wavelength of the UV radiation is from about 2900 Angstroms to about 4050 Angstroms. The lamp system used to generate such UV radiation may consist of discharge lamps, e.g. xenon, metallic halide, metallic arc, or high, medium, or low pressure mercury vapor discharge lamps, etc., each having operating pressures of from as low as a few millitorrs up to about ten (10) atmospheres. The radiation dose level applied to coating 38 through substrate 11 may range from about two (2.0) J/cm2 to about ten (10.0) J/cm2. A typical curing system suitable for the present invention is a Linde medium pressure mercury lamp, as described in U.S. Pat. No. 4,477,529. The number of lamps directing light to the surface of the substrate is not critical; however, a greater number of lamps may allow a higher production rate for the substrate having coating 38 thereon. Typically, two lamps, each producing 300 watts/linear inch of radiant energy, are sufficient for an acrylic-based coating having a thickness of about 0.5 mil, when the production line speed is approximately fifty (50) feet/minute. Such a curing procedure should result in both the polymerization of the polyfunctional acrylic monomers and the cross-linking of the polymers to form hard, non-tacky coatings. The coating may receive the post curing by further exposure to ultraviolet radiation after leaving the surfaces of the casting drum.

After the layer of coating material has been applied to and cured on substrate 11 according to the method of the present invention, the resulting product is a hard coated polycarbonate film article 40 which is guided around idler rolls 64, 66 and 68 then collected on take-up roll 70.

Example 3

Forming a Low Birefringence One-side Polished, One-side Textured Substrate Film

The one sided textured polycarbonate film (0.005" to 0.030") is made by extrusion. The melt is forced into a nip between two (2) rolls. The gap between the rolls determines the film thickness. The thickness consistency is +/- five percent (5%) for a 0.010" film. This film is produced using a super smooth, insulating, PTFE sleeved roll with Ra surface roughness of twenty (20) to forty (40) μm on the top surface. The bottom roll is highly polished chrome.

The coating is applied to the textured side of the substrated film to smooth out the surface. During the curing of the coating, the heat tends to further anneal the film and reduce the stress level. The coating also provides improved abrasion, and chemical resistance and provides a barrier to water vapor (WVTR). Taber Abrasion Resistance (ASTM J)1044) for a CS10F wheel, 500 grams, and 100 cycles in a change in percent (%) haze of between five to thirty (5–30). Chemical resistance (determined via a 24 hour surface exposure test at 120° F) is exhibited for these common household materials (coffee, Chlorox, ketchup, and tea. The measured WVTR for an acrylic coated 0.010" polycarbonate film was 0.5 to 1.0 grams water/100 in2/24 hours. This WVTR measurement was performed at 73° F., and 100% relative humidity with a wet filter material, which was covered by glass to maintain control conditions. Furthermore, said film was placed under water and in similar conditions as above for one (1) week, and evidenced no failure nor damage.

Although the present invention has been described and illustrated in detail, it is clearly understood that the same is by way of illustration and example only and is not to be taken by way of limitation; the spirit and scope of the present invention being limited only in terms of the appended claims.

What is claimed is:

1. A coated thermoplastic film substrate comprising:
    a thermoplastic film substrate having an upper and lower surface, wherein, when not coated, the upper surface is textured, has a gloss of at least 85% as measured at 85 degrees in accordance with ASTM D523, and a surface roughness of about 20 to about 40 micrometers; and
    an ultraviolet radiation cured acrylic coating disposed on the upper surface;
    wherein the cured acrylic coating has low birefringence and a surface roughness of about 3.0 to about 10.0 micrometers; and
    wherein the coated thermoplastic film substrate has a delta refractive index of less than about 0.1 between the cured acrylic coating and thermoplastic film substrate.

2. The coated thermoplastic film substrate of claim 1, wherein the cured acrylic coating comprises an ultraviolet radiation reaction product of a coating composition comprising a brominated epoxy acrylic oligomer, a functional acrylate monomer, an organopolysiloxane hardcoat composition, and a photoinitiator.

3. The coated thermoplastic film substrate of claim 1, wherein the upper surface has a surface gloss of at least 90% as measured at 85 degrees in accordance wit ASTM D523, and a birefringence of less than 25 nanometers.

4. A coated thermoplastic film substrate comprising:
    a thermoplastic film substrate having an upper and lower surface, wherein, when not coated, the upper surface is textured, has a gloss of at least 85% as measured at 85 degrees in accordance with ASTM D523, and a surface roughness of about 20 to about 40 micrometers, and wherein the lower surface is polished; and
    an ultraviolet radiation cured acrylic coating on the upper surface, wherein the cured acrylic coating has a surface gloss of at least 90%, a birefringence of less than 25 nanometers, and a surface roughness of about 3.0 to about 10.0 micrometers;
    wherein the coated thermoplastic film substrate has a delta refractive index of less than about 0.1 between the acrylic coating and the thermoplastic film substrate;
    wherein the cured acrylic coating; comprises an ultraviolet radiation reaction product of coating composition comprising a brominated epoxy acrylic oligomer, a functional acrylate monomer, an organopolysiloxane hardcoat composition and a photoinitiator; and
    wherein the cured acrylic coating was directly adhered to the thermoplastic film substrate by heating the coating composition to a temperature between about 90° F. and about 150° F. and ultraviolet radiation curing the heated coating composition to form an interlocking bond between the substrate and cured acrylic coating.

5. The coated thermoplastic film substrate of claim 4 wherein the cured acrylic coating layer has a thickness of from 0.05 to about 5 mils.

6. The coated thermoplastic film substrate of claim 4 wherein to thermoplastic substrate has a thickness of about 5 to about 20 mils.

7. The coated thermoplastic film substrate of claim 4 wherein the functional acrylate monomer is a mono-functional acrylate monomer.

8. The coated thermoplastic film substrate of claim 4 wherein the delta refractive index between the cured acrylic coating layer and the thermoplastic substrate is less than about 0.08.

9. The coated thermoplastic film substrate of claim 4 wherein the delta refractive index between the cured acrylic coating layer and the thermoplastic substrate is less than about 0.05.

10. The coated thermoplastic film substrate of claim 4 wherein the thermoplastic film substrate is an aromatic polycarbonate.

11. The coated thermoplastic film substrate of claim 4 wherein the coating composition comprises more than 75 weight % of a brominated epoxy acrylate in combination with an acrylate monomer, less than 5 weight % of a photoinitator, and less than 20 weight % of an organopolysiloxane hard coat composition, wherein the weight % is based on the total weight of the coating composition.

12. A method of making a coated thermoplastic film substrate, comprising:

disposing a thermoplastic material between rollers to produce a thermoplastic film substrate having an textured upper surface having a gloss of at least 85% as measured at 85 degrees in accordance with ASTM D523 and a surface roughness of about 20 to about 40 micrometers;

applying an acrylic coating to the upper surface; and curing the acrylic coating with ultraviolet radiation;

wherein the cured acrylic coating has low birefringence surface roughness of about 3.0 to about 10.0 micrometers, and wherein the coated thermoplastic film substrate has a delta refractive index of less than about 0.1 between the cured cured acrylic coating and thermoplastic film substrate.

13. The method of claim 12, further comprising heating the acrylic coating to a temperature between about 90° F. and about 150° F.

\* \* \* \* \*